United States Patent [19]

Koch et al.

[11] Patent Number: 5,397,027
[45] Date of Patent: Mar. 14, 1995

[54] STOPPER FOR A METERED DISPENSING UNIT

[75] Inventors: Frank J. Koch, Ogdensburg; Douglas Cleminshaw, Tully, both of N.Y.

[73] Assignee: DeFelsko Corporation, Ogdensburg, N.Y.

[21] Appl. No.: 131,745

[22] Filed: Oct. 4, 1993

[51] Int. Cl.$^6$ ............................................. G01F 11/00
[52] U.S. Cl. ........................................ 222/1; 222/479; 222/569; 222/573
[58] Field of Search .................... 222/1, 478, 479, 567, 222/569, 570, 573

[56] References Cited

U.S. PATENT DOCUMENTS

| | | | |
|---|---|---|---|
| 3,630,419 | 12/1971 | Pierce | 222/478 |
| 3,966,099 | 6/1976 | Sanford, Jr. et al. | 222/478 |
| 3,968,907 | 7/1976 | Nix | 222/416 |
| 4,129,236 | 12/1978 | Wrycraft et al. | 222/570 |
| 5,137,184 | 8/1992 | Jackson et al. | 222/569 X |
| 5,211,318 | 5/1993 | Govatzidakis | 222/567 X |

FOREIGN PATENT DOCUMENTS 892492  3/1962  United Kingdom ............... 222/478

*Primary Examiner*—Andres Kashnikow
*Assistant Examiner*—Joseph A. Kaufman
*Attorney, Agent, or Firm*—Burns, Doane, Swecker & Mathis

[57] ABSTRACT

A stopper for use in a metered dispensing unit including a conduit for carrying fluid from a container to a metering portion of the dispensing unit, the conduit having a flange at one end, a sealing member arranged on the conduit for sealing the conduit against an inside surface of the container, the sealing member having a tube through which the conduit extends, and a system for replaceably securing the sealing member on the conduit between the flange and an end of the conduit which is opposite the flange. For example, the securing system may include a releasable retaining clip.

21 Claims, 3 Drawing Sheets

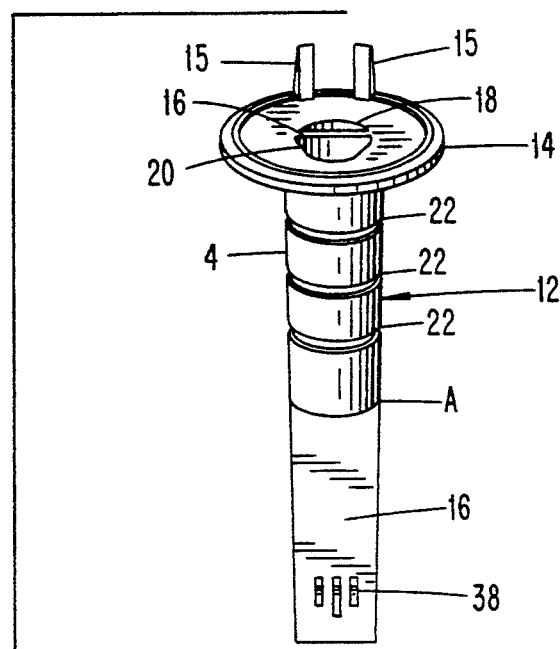
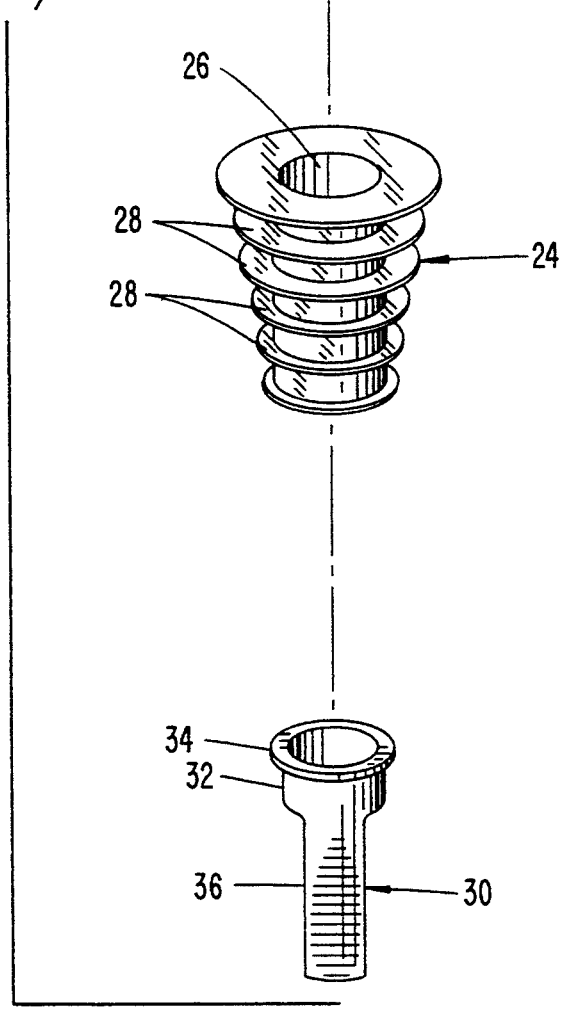
Fig. 6

STOPPER FOR A METERED DISPENSING UNIT

BACKGROUND OF THE INVENTION

1. Field of the Invention

The present invention generally relates to dispensing, and more particularly, to a stopper for use in a metered dispensing unit.

2. Description of the Related Art

Metered dispensing units are useful in applications where a predetermined amount of material must be measured and dispensed from a container. For example, metered dispensing units have become quite common in taverns where one ounce "shots" of liquor must be measured and dispensed from bottles. In such settings, the liquor bottles are typically stored on a "call rack" with a separate dispensing unit in each bottle. When a bottle becomes empty, the dispensing unit is removed from the empty bottle and reused on a full bottle. Consequently, a dispensing unit may be reused on many different bottles.

One such liquor dispensing unit is illustrated in FIG. 1 of the present application and generally described in U.S. Pat. No. 3,968,907 to Nix, nee Saxler. The dispensing unit 102 includes a conduit 104 extending from one end for carrying a liquid from a container, such as a bottle (not shown), into a metering portion 106 of the dispensing unit 102. The liquid is then poured from the metering portion 106.

The dispensing unit 102 includes a sealing element 108 for holding the conduit 104 within the neck of the container and allowing the contents of the container to be poured through the conduit 104 without leaking. In a typical application, the sealing element 108 fits tightly within the neck of a liquor bottle to create a fluid-tight and air-tight seal between the dispensing unit 102 and the bottle. Metered shots may then be quickly and easily poured from the bottle through the dispensing unit 102. When the bottle is empty, the dispensing unit 102 is removed from the empty container and reused in a full container.

The sealing element 108 includes thin, flexible plates 110, which become worn with age and normal use. In conventional metered dispensing units, the sealing element 108 is fixedly secured to the conduit 104 so that it cannot be easily replaced when the plates 110 are worn. For example, the sealing element 108 might be heat-shrunk onto the conduit 104. Consequently, when the sealing element 104 becomes worn, the entire dispensing unit 102 must be replaced at great cost.

The dispensing unit 102 also includes a cap 112 which is molded on or otherwise fixed to the metering portion 106 of the dispensing unit. The side edges of the cap 112 cover the outside of a container in normal use. Consequently, the dispensing unit in FIG. 1 cannot be used with containers having necks that are wider than the inside diameter of the cap 112.

SUMMARY OF THE INVENTION

The present disclosure generally relates to a stopper for use in a metered dispensing unit that includes a conduit for carrying fluid from a container to a metering portion of the dispensing unit, a sealing member for sealing the conduit against an inside surface of said container, and means for replaceably securing the sealing member on the conduit.

The conduit may include a flange at one end and the sealing member may be securable on the conduit between the flange and a releasable retaining clip. The releasable retaining clip may include a ring member for slidably engaging an outer surface of the conduit. One end of the ring member contacts the sealing member. An arm extends away from the other end of the ring, which faces away from the sealing member. A projection on the conduit engages the arm to secure the retaining clip on the conduit. At least one prong may extend from the flange for attaching the flange to the dispensing unit.

The conduit may be separated by a dividing wall into two flow channels of different lengths with the projection extending from the dividing wall on the outer surface of the longer one of said flow channels. The ring member may also include a lug extending away from the sealing member along an outer surface of said conduit. The lug is preferably arranged on a side of said ring member which is opposite from said arm. The arm may be curved in two dimensions to cooperate with the outer surface of the conduit and to more easily engage the projection.

The sealing member may comprise a tube through which the conduit extends. A plurality of annular fins or plates may extend from an outer surface of the tube wherein each of the fins is arranged substantially parallel to the flange. Each of the fins may have a substantially circular outer periphery. A diameter of the outer periphery of one of the fins near the flange may be greater than a diameter of the outer periphery of another one of the fins farther away from the flange. The sealing member may include a material selected from the group consisting of

BRIEF DESCRIPTION OF THE DRAWINGS

The invention will now be further described with reference to the following figures in which like features have been provided with the same reference numerals.

FIG. 5 is an exploded view of the stopper in FIG. 3.

DESCRIPTION OF THE PREFERRED EMBODIMENTS

FIGS. 2–5 illustrate one embodiment of a stopper 10 according to the present invention. The stopper 10 includes an inner body 12 having a tubular conduit 4 with a flange 14 at one end of the conduit 4. The body 12 may be molded or machined from any suitable material such as plastic, metal, or rubber. The flange 14 and the conduit 4 may also be formed separately and then attached to each other.

Figure 1:
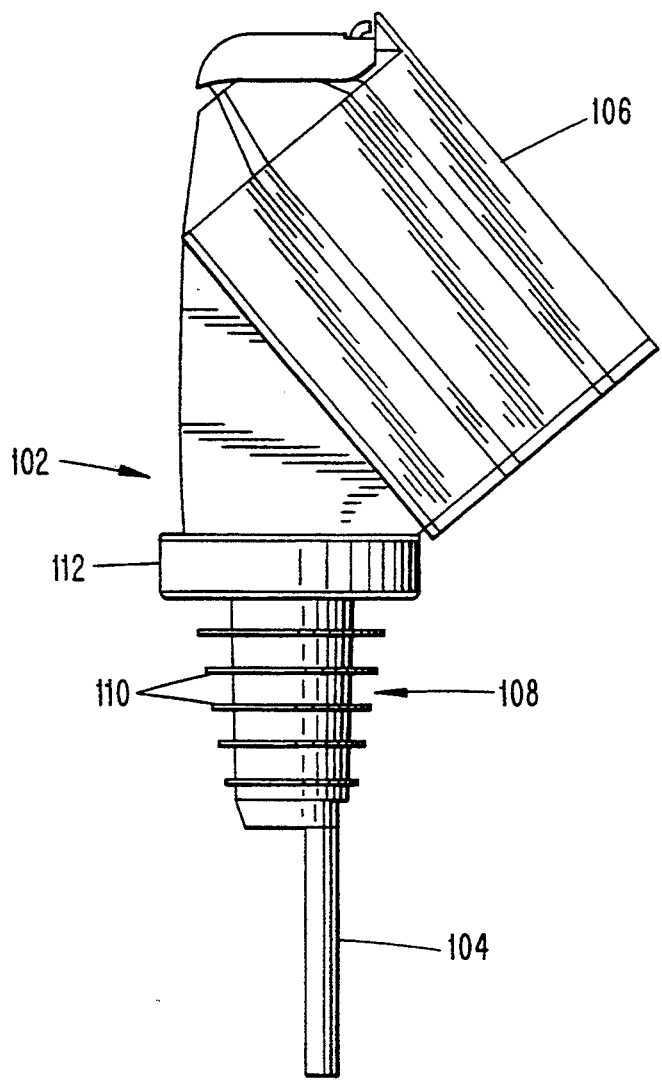
FIG. 1 illustrates a conventional metered dispensing unit including a stopper.
Figure 2:
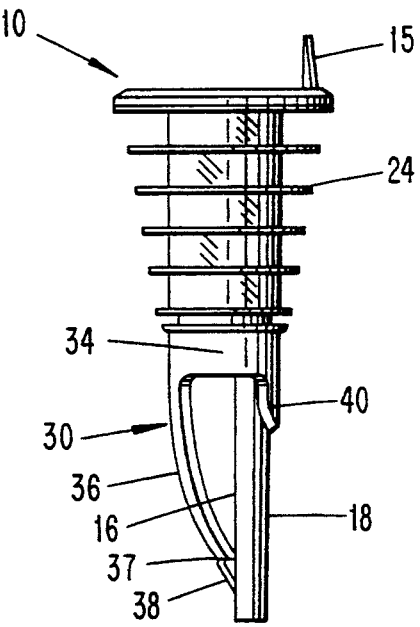
FIG. 2 is a side view of a stopper according to the present invention.
Figure 3:
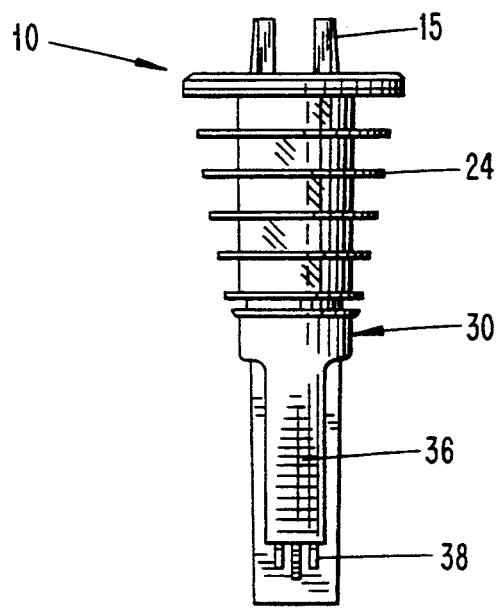
FIG. 3 is another side view of the stopper in FIG. 2.

The flange 14 may include two prongs 15 for aligning, securing, and/or attaching the body 12 to a suitable dispensing unit. For example, the stopper 10 may be used to replace the prior art conduit 104 and sealing element 108 illustrated in FIG. 1. The flange 14 may be permanently or releasably attached to the metering portion 106 of dispensing unit 102 such as by attachment with an adhesive.

Figure 4:
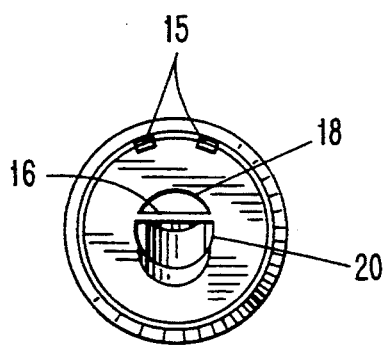
FIG. 4 is an end view of the stopper in FIG. 3.

The conduit 4 may include a dividing wall 16 which separates the inside of the conduit 4 into two flow channels. As illustrated in FIGS. 4 and 5, the upper flow channel 18 may have a smaller cross-section than the lower flow channel 20. The upper flow channel 18 typically carries air while the lower flow channel 20 carries the liquid contents of the container. As illustrated in FIG. 5, the upper flow channel 18 may extend to the end of the conduit 4, and the lower flow channel 20 may only extend partway, such as to point A.

Each of the illustrated flow channels 18, 20 has a semi-circular cross-section which may taper slightly in a direction away from the flange 14. However, a variety of other shapes and flow channel configurations may also be used for the conduit 4. The outer surface of the conduit 4 may also include annular grooves 22 for securing a sealing member 24 to the body 12 as described in more detail below.

The sealing member 24 includes a tubular sleeve 26 extending therethrough. The conduit 4 is fitted through the tubular sleeve 26 in the sealing member 24 until the flange 14 on body 12 abuts one end of the sealing member 24. Alternatively, the internal diameter of the sleeve 26 may be slightly smaller than the external diameter of the conduit 4 so that the sleeve 26 may be compression fit onto the conduit 4. In addition, the inside of the sleeve 26 may be tapered to correspond to any taper of the outer surface of the conduit 4.

The sealing member 26 may be provided with one or more annular fins or plates 28 for sealing against the inside of the container. In the illustrated embodiment, all of the fins 28 have a generally circular outer periphery for sealing against the round throat of a bottle. The diameter of each fin 28 preferably increases from a first end to the second end so that one size sealing member 24 may be used with bottles of varying sizes. However, other fin shapes, sizes, and configurations may also be used to conform to other types of containers and openings in those containers.

The sealing member 24 may be made in different sizes in order to accommodate bottles of different sizes. For example, a sealing member adapted for large sized bottles would have fins of a larger diameter than would a sealing member for smaller bottles.

In addition, some size versatility may be accomplished by reversing the sealing member 24 on the conduit 4. For example, if a sealing member 24 fits nicely in a specifically sized bottle when the largest diameter fins 28 are adjacent the flange 14, the sealing member 24 may accommodate a larger bottle if the sealing member 24 is reversed so that the smaller diameter fins 28 are adjacent the flange 14.

The sealing member 24 may be molded and/or machined from any suitable material such as plastic or rubber. Materials such as ELVAX 260 Nat. and SANTOPRENE 271-73 Nat. have been found to be useful. SANTOPRENE is the tradename of a thermoplastic elastomer product available from Monsanto Chemical Co. which includes a fully vulcanized copolymer of propylene and ethylenepropylene diene monomer. ELVAX is the tradename of a product available from E. I. DuPont de Nemours Co. which includes an ethylene vinyl acetate copolymer.

The sealing member 24 may be replaceably secured to the body 12 with a releasable retaining clip 30. The term "replaceably secured," as used here, is intended to mean that the sealing member 24 may be easily removed and replaced with a new sealing member when it becomes worn or damaged. In the illustrated embodiment, the releasable retaining clip 30 may be removed from the conduit 4 so that the sealing member 24 may be slid off of the end of the conduit 4 away from the flange 14. Alternatively, the sealing member 24 may be replaceably secured without using the retaining clip 30. For example, the sealing member 24 may be secured to conduit 4 with a different type of fastener, with a releasable adhesive, or solely by frictional forces.

The illustrated retaining clip 30 includes a ring member 32 at one end for engaging and encircling the conduit 4. Although the illustrated ring member 32 is circular and extends completely around the conduit 4, the ring member 32 may take on other shapes and/or may extend only part way around the conduit 4. The ring member 32 may include a lip 34 for allowing the retaining clip 30 to be more easily grasped and for providing additional strength to the ring member 32.

The ring member 32 may be securely fastened to the conduit 4 by frictional forces. For example, the retaining clip 30 may be slid along the outer surface of the conduit 4 until the increasing diameter of the conduit 4 fully engages the inner surface of the ring member 32 and the ring member 32 will not slide any further. In addition or alternatively, the retaining clip 32 may include an arm 36 extending from the ring member 32. The arm 36 may be curved so as to extend down over the end of the truncated portion of the lower flow channel 20 of the conduit 4. Alternatively, the arm may extend linearly down over the truncated portion of the lower flow channel 20 without curving.

One or more nubs or projections 38 may be arranged on the exposed outer portion of dividing wall 16. The projections 38 serve to abut the tip 37 of the arm 36 and thus prevent the retaining clip 30 from sliding off of the conduit 4 (see FIG. 2). The projections 38 shown in the figures are preferably formed as right-triangular members extending from the dividing wall 16. The triangular shape of the projections 38 and the flexibility of the material from which the arm is made combine to allow the arm 36 to be gradually lifted over the projections 38 before snapping into place behind the projections 38 as the ring member 32 is slid up the conduit 4. However, a variety of other shapes and configurations may also be used to form the projections 38. The curved shape of the arm 36 further encourages the snapping action of the arm 36 over the projections 38.

To replace a worn sealing member 24, one lifts the retaining clip 30 over the projections 28 and slides the retaining clip off the conduit 4. Once the retaining clip 30 is removed, the sealing member 24 may be slid off the conduit 4. A new sealing member 24 may then be slid onto the conduit until it engages with the flange 14 of the body 12. As mentioned above, the sealing member 24 may be mounted with either side (i.e., the large diameter fins or the small diameter fins) adjacent to the flange 14. After the sealing member 24 is mounted, the retaining clip 30 may be replaced onto the conduit 4.

The retaining clip 30 may also include a lug 40 extending from the ring member 32 on an opposite side from the arm 36. The arm 36 may be curved and/or tapered to conform to the outer surface of the conduit 4. The lug 40 serves to support the ring member 32 as the arm 36 is lifted over the projection 38.

Figure 6:
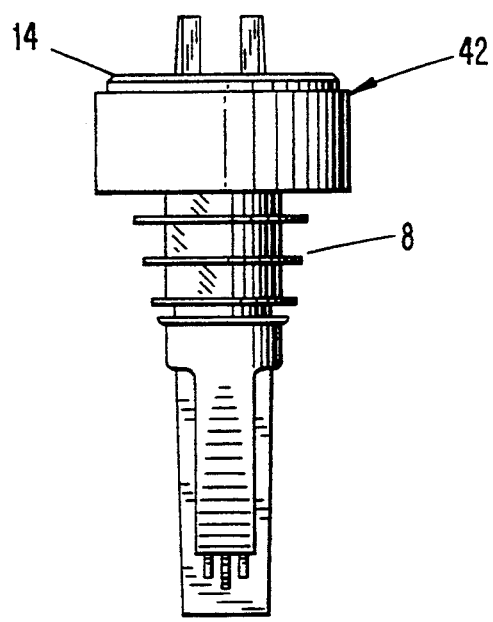
FIG. 6 is a side view of a cap used with the stopper in FIGS. 2–5.
Figure 7:
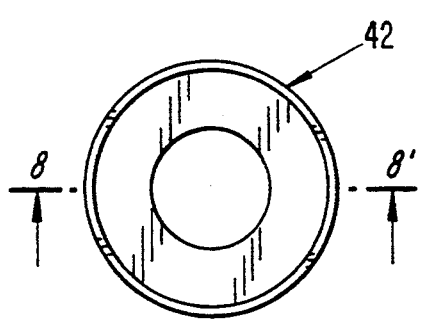
FIG. 7 is a bottom view of the cap in FIG. 6.
Figure 8:
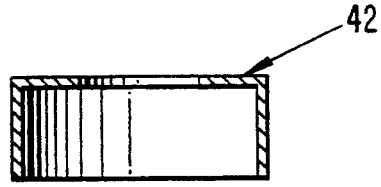
FIG. 8 is a cross-sectional view of the cap taken along section line 8—8' in FIG. 7.

FIGS. 6, 7, and 8 illustrate a removable cap 42 which may be used with the present invention. The cap 42 may be slipped onto the stem portion of conduit 4 between the sealing element 8 and the flange 14. The removable cap 42 may be sized to fit the width of any particular container neck. Although only a circular cap 42 is illustrated, the cap 42 may be formed in a variety of shapes such as square, oval, elliptical, or octagonal to fit almost any container. Consequently, the removable cap 42 allows the stopper 10 to be used with a wider variety of containers than conventional fixed caps.

A porous screen may be placed in the outlet of the metering portion 106 of the dispensing unit 102 and any other openings for keeping vermin such as insects out of the dispensing unit and the container to which it is attached.

The principles, preferred embodiments, and modes of operation of the present invention have been described in the foregoing specification. However, the invention should not be construed as limited to the particular embodiments which have been described above. Instead, the embodiments described here should be regarded as illustrative rather than restrictive. Variations and changes may be made by others without departing from the scope of the invention as defined by the following claims.

What is claimed is:

1. A stopper for use in a dispensing unit, comprising:
   a conduit for carrying fluid from a container to a dispensing portion of the dispensing unit, including a flange at one end of the conduit;
   a sealing member, replaceably securable on said conduit, for sealing said conduit against an inside surface of the container; and
   means for securing the sealing member on the conduit, said securing means removably engaging said conduit at a location remote from said flange.

2. The stopper of claim 1, wherein said sealing member is securable on said conduit between said flange and said securing means.

3. The stopper of claim 2, wherein the securing means is a releasable retaining clip.

4. The stopper of in claim 3, wherein said conduit includes a projection extending from an outer surface thereof.

5. The stopper of claim 3, wherein said releasable retaining clip includes a ring member for slidably engaging an outer surface of said conduit and an arm extending from one side of the ring member for engaging the projection from the conduit.

6. The stopper of claim 5, wherein said arm is curved.

7. The stopper of claim 2, wherein said sealing member includes a tube through which said conduit extends, said tube having a plurality of fins extending from an outer surface of said tube wherein each of said fins is arranged substantially parallel to each other.

8. The stopper of claim 7, wherein each of said fins has a substantially circular outer periphery and is arranged perpendicular to said tube.

9. The stopper of claim 8, wherein a diameter of the outer periphery of one of said fins is greater than a diameter of the outer periphery of another one of said fins.

10. The stopper of claim 2, further including a cap replaceably secured on said conduit between said flange and said sealing member.

11. The stopper of claim 1, wherein said sealing member includes a copolymer.

12. The stopper of claim 1, further comprising a ramp-shaped projection on said conduit, and
   said securing means includes a flexible arm that can pass over the projection in one direction to enable the securing means to be put on the conduit.

13. The stopper of claim 12, wherein the projection further includes an abrupt surface that engages the arm of the securing means and prevents the securing means from being removed from the conduit without first bending the arm.

14. The stopper of claim 1, wherein said sealing member is reversible in that it can be secured on the conduit in a first direction to accommodate a bottle of a first size and it can be secured on the conduit in a second direction to accommodate a bottle of a second size.

15. A stopper for use in a dispensing unit, comprising:
   a conduit having a flange at one end and a projection extending from an outer surface of said conduit,
   a sealing member for sealing said conduit against an inside surface of a container, said sealing member including a tube through which said conduit extends and a plurality of fins extending from an outer surface of said tube wherein each of said fins is arranged substantially parallel to said flange; and
   a releasable retaining clip including a ring member for slidably engaging the outer surface of the conduit and an arm extending from one side of said ring member for engaging said projection from the conduit.

16. The stopper of claim 15 further including a cap replaceably secured on said conduit between said flange and said sealing member.

17. The stopper of claim 15, wherein said projection is at a location remote from the flange.

18. A method of replacing a sealing member on a stem of a dispensing unit, said stem having a flange for abutting the sealing member, comprising the steps of:
   removing a retaining clip from the stem; said retaining clip being located on the stem at a location remote from the flange;
   sliding the sealing member off the stem;
   putting a new sealing member onto the stem; and
   replacing the retaining clip on the stem at a location remote from the flange.

19. The method of claim 18, wherein the retaining clip removing step includes releasing the retaining clip from a catch on the stem.

20. The method of claim 19, wherein the releasing step includes lifting an arm of the retaining clip over a projection on the stem.

21. The method of claim 20, wherein the replacing step includes catching the arm on the projection to secure the arm on the stem.

* * * * *